(12) United States Patent
Yokoyama (10) Patent No.: US 10,340,509 B2
(45) Date of Patent: Jul. 2, 2019

(54) ELECTRODE ASSEMBLY AND BATTERY

(71) Applicant: SEIKO EPSON CORPORATION, Tokyo (JP)

(72) Inventor: Tomofumi Yokoyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 596 days.

(21) Appl. No.: 15/075,534

(22) Filed: Mar. 21, 2016

(65) Prior Publication Data

US 2016/0285080 A1 Sep. 29, 2016

(30) Foreign Application Priority Data

Mar. 26, 2015 (JP) ................................. 2015-063912

(51) Int. Cl.
*H01M 4/131* (2010.01)
*H01M 4/36* (2006.01)
(Continued)

(52) U.S. Cl.
CPC ........... *H01M 4/364* (2013.01); *H01M 4/131* (2013.01); *H01M 4/1391* (2013.01);
(Continued)

(58) Field of Classification Search
CPC .. H01M 4/364; H01M 4/483; H01M 10/0562; H01M 10/052; H01M 4/523;
(Continued)

(56) References Cited

U.S. PATENT DOCUMENTS

2004/0096745 A1   5/2004   Shibano et al.
2009/0226790 A1 *  9/2009   Kanamura ............... B32B 18/00
                                                    429/493
(Continued)

FOREIGN PATENT DOCUMENTS

JP        09-265976      * 10/1997   ............ H01M 4/02
JP     2004-179158 A       6/2004
(Continued)

OTHER PUBLICATIONS

Machine translation of JP 2009-004289, retrieved from <https://www4.j-platpat.inpit.go.jp/eng/tokujitsu/tkbs_en/TKBS_EN_GM101_Top.action> on Sep. 18, 2018.*
(Continued)

*Primary Examiner* — Cynthia K Walls
(74) *Attorney, Agent, or Firm* — Oliff PLC

(57) ABSTRACT

An electrode assembly 10 includes an assembly 4 including an active material compact (active material section) 2 including an active material constituted of a transition metal oxide, a solid electrolyte layer (solid electrolyte section) 3 including a solid electrolyte having an ion-conducting property, and a multiple oxide layer (multiple oxide section) 5 including at least one of a metal multiple oxide represented by General Formula (II) below and a derivative thereof and a collector 1 provided so as to join the active material compact 2 on one surface (first surface) 41 of the assembly.

$$Ln_2Li_{0.5}M_{0.5}O_4 \qquad (II)$$

In the formula, Ln represents a lanthanoid element, and M represents a transition metal.

12 Claims, 7 Drawing Sheets

(51) Int. Cl.
| | |
|---|---|
| *H01M 4/1391* | (2010.01) |
| *H01M 4/525* | (2010.01) |
| *H01M 4/62* | (2006.01) |
| *H01M 4/48* | (2010.01) |
| *H01M 4/485* | (2010.01) |
| *H01M 4/50* | (2010.01) |
| *H01M 4/52* | (2010.01) |
| *H01M 10/052* | (2010.01) |
| *H01M 10/0562* | (2010.01) |

(52) U.S. Cl.
CPC ........... *H01M 4/483* (2013.01); *H01M 4/485* (2013.01); *H01M 4/502* (2013.01); *H01M 4/523* (2013.01); *H01M 4/525* (2013.01); *H01M 4/624* (2013.01); *H01M 10/052* (2013.01); *H01M 10/0562* (2013.01); *H01M 4/366* (2013.01); *H01M 2220/30* (2013.01)

(58) Field of Classification Search
CPC ...... H01M 4/502; H01M 4/485; H01M 4/525; H01M 4/131; H01M 4/1391; H01M 4/624; H01M 2220/30; H01M 4/366
See application file for complete search history.

(56) References Cited

U.S. PATENT DOCUMENTS

| | | |
|---|---|---|
| 2012/0115039 A1 | 5/2012 | Ouchi et al. |
| 2014/0377655 A1 | 12/2014 | Mun et al. |

FOREIGN PATENT DOCUMENTS

| | | | |
|---|---|---|---|
| JP | 2006-277997 A | 10/2006 | |
| JP | 2009-004289 * | 1/2009 | ............. H01M 4/02 |
| JP | 2009-215130 A | 9/2009 | |
| JP | 4615339 B2 | 1/2011 | |
| WO | 2011/132627 A1 | 10/2011 | |

OTHER PUBLICATIONS

Machine translation of JP 09-265976, retrieved from <https://www4.j-platpat.inpit.go.jp/eng/tokujitsu/tkbs_en/TKBS_EN_GM101_Top.action> on Sep. 20, 2018.*

Ryu, The effect of surface modification with La—M—O (M= Ni, Li) on electrochemical performances of Li[Ni0.8Co0.15Al0.05]O2 cathode, Bulletin of the Korean Chemical Society, 2009, 30 (3), 657-660. (Year: 2009).*

Aug. 26, 2016 Extended Search Report issued in European Patent Application No. 16162314.5.

Fey, George Ting-Kuo et al., "Surface modification of LiNi0.8Co0.2O2 with La2O3 for lithium-ion batteries", Solid State Ionics, Nov. 30, 2005, vol. 176, No. 37-38, pp. 2759-2767.

Fey, George Ting-Kuo et al., "Enhanced electrochemical performance and thermal stability of La2O3-coated LiCoO2", Electrochimica Acta, Jun. 15, 2006, vol. 51, No. 23, pp. 4850-4858.

* cited by examiner

ELECTRODE ASSEMBLY AND BATTERY

This application claims a priority to Japanese Patent Application No. 2015-063912 filed on Mar. 26, 2015 which is hereby expressly incorporated by reference in its entirety.

BACKGROUND

1. Technical Field

Several aspects of the present invention relate to an electrode assembly and a battery.

2. Related Art

As a power supply for a number of electrical devices including a portable information device, a battery such as a lithium battery (including a primary battery and a secondary battery) is used. The lithium battery includes a positive electrode, a negative electrode, and an electrolyte layer which is installed between these electrodes and mediates the conduction of lithium ions.

In recent years, as a lithium battery satisfying both a high energy density and stability, an all-solid-state lithium battery in which a solid electrolyte is used as a forming material of an electrolyte layer has been proposed (for example, refer to JP-A-2006-277997, JP-A-2004-179158, and Japanese Patent No. 4615339).

However, the all-solid-state lithium battery is required to stably have a high output and a high capacity over a long period of time, but an all-solid-state lithium battery of the related art does not sufficiently have the above-described characteristics at all times.

SUMMARY

An advantage of some aspects of the invention is to solve at least a part of the problems described above, and the invention may employ the following constitutions and embodiments.

An electrode assembly according to an aspect of the invention includes an assembly including an active material section, a solid electrolyte section and a multiple oxide section and a collector joined to the assembly, in which the active material section includes an active material constituted of a transition metal oxide, the solid electrolyte section includes a solid electrolyte having an ion-conducting property, the multiple oxide section includes at least one of a metal multiple oxide represented by Formula (II) and a derivative thereof, and the collector is joined to at least one of the active material section and the multiple oxide section.

$$Ln_2Li_{0.5}M_{0.5}O_4 \quad (II)$$

(In the formula, Ln represents a lanthanoid element, and M represents a transition metal.)

When an electrode assembly having the above-described constitution is applied to a battery, the battery becomes capable of stably maintaining a high output and a high capacity over a long period of time.

In the electrode assembly, it is preferable that the multiple oxide section is formed between the active material section and the solid electrolyte section.

When an electrode assembly having the above-described constitution is applied to a battery, the battery becomes capable of stably maintaining a high output and a high capacity over a long period of time.

In the electrode assembly, it is preferable that the multiple oxide section is formed in a lamellar form so as to cover the active material section.

When an electrode assembly having the above-described constitution is applied to a battery, the battery becomes capable of stably maintaining a high output and a high capacity over a long period of time.

In the electrode assembly, it is preferable that the active material section includes multiple through holes therein and the multiple oxide section covers surfaces of the multiple through holes.

When an electrode assembly having the above-described constitution is applied to a battery, the battery becomes capable of stably maintaining a high output and a high capacity over a long period of time.

In the electrode assembly, it is preferable that a surface of the assembly to which another electrode for constituting a battery is joined is the solid electrolyte section.

When an electrode assembly having the above-described constitution is applied to a battery, neither the active material section nor the multiple oxide section are in contact with another battery, and thus the battery can be highly stable.

In the electrode assembly, it is preferable that an electron conductivity of the multiple oxide section is higher than an electron conductivity of the active material section.

When an electrode assembly having the above-described constitution is applied to a battery, the battery becomes capable of stably maintaining a high output and a high capacity over a long period of time.

In the electrode assembly, it is preferable that the transition metal oxide includes at least one of lithium, cobalt, manganese, and nickel.

According to this constitution, the active material section can be provided with two characteristics of a high electron-conducting property and a small charge and discharge volume change ratio. Therefore, an increase in the capacity and the service life of a lithium secondary battery can be achieved.

In the electrode assembly, it is preferable that the solid electrolyte has a garnet-type crystal structure or a garnet-type analogous crystal structure.

According to this constitution, the solid electrolyte becomes capable of facilitating the exchange of lithium ions with the multiple oxide layer having a tetragonal crystal structure.

It is preferable that a battery according to an aspect of the invention includes the electrode assembly and an electrode provided on a surface of the electrode assembly to which another electrode is joined.

When a battery includes an electrode assembly including an active material compact having the above-described constitution, the battery becomes capable of stably maintaining a high output and a high capacity over a long period of time.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments and examples according to the invention will be described using the accompanying drawings. Meanwhile, the drawings used for the description are used for the convenience of the description, and thus there are cases in which the dimensions, ratios, and the like of constitutional elements shown in the drawings differ from those of actual constitutional elements. In addition, in the description of the drawings, the upper side of a drawing will be referred to as "up" and the lower side thereof will be referred to as "down".

First Embodiment

This embodiment describes one embodiment of an electrode assembly and a lithium secondary battery in which the electrode assembly is used.

Figure 1:
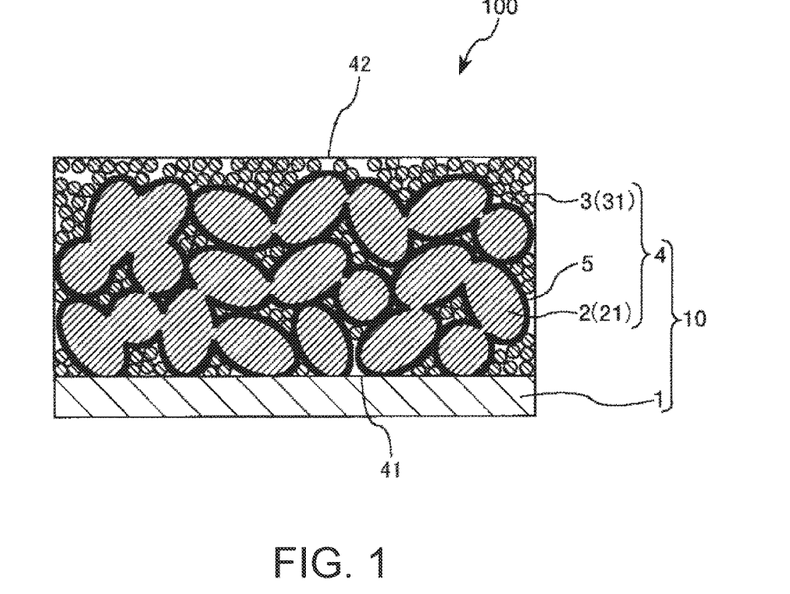
FIG. 1 is a vertical sectional view of an electrode assembly according to a first embodiment.

FIG. 1 shows an electrode assembly 10. The electrode assembly 10 includes a collector 1, an active material compact 2, a multiple oxide layer 5, and a solid electrolyte layer 3.

Figure 2:
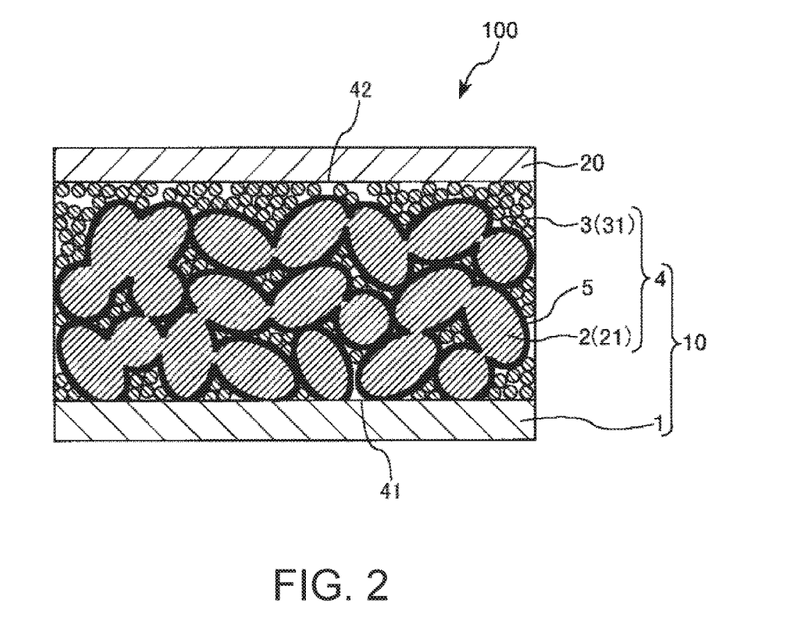
FIG. 2 is a vertical sectional view of a lithium secondary battery for which the electrode assembly according to the first embodiment is used.

FIG. 2 shows a lithium secondary battery 100 for which the electrode assembly 10 is used. The lithium secondary battery 100 includes the electrode assembly 10 and an electrode 20 as constitutional elements. The lithium secondary battery 100 is a so-called all-solid-state lithium (ion) secondary battery.

First, the electrode assembly 10 will be described using FIG. 1. Here, the active material compact 2, the solid electrolyte layer 3, and the multiple oxide layer 5 will be collectively referred to as an assembly 4. The electrode assembly 10 is constituted of the collector 1 and the assembly 4. The multiple oxide layer 5 is provided so as to cover the active material compact 2, and the active material compact 2 is in contact with the solid electrolyte layer 3 through the multiple oxide layer 5.

The collector 1 is provided in contact with a surface (first surface) 41 of the assembly 4. The collector 1 functions as a positive electrode in a case in which the active material compact 2 is constituted of a positive electrode active material and functions as a negative electrode in a case in which the active material compact 2 is constituted of a negative electrode active material.

A forming material (constituting material) of the collector 1 is, for example, a metal (metal single body) selected from a group consisting of copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd) or an alloy including two or more metal elements selected from the above-described group.

The shape of the collector 1 is not particularly limited, and examples thereof include a plate shape, a foil shape, and a net shape. In addition, the surface of the collector 1 may be a flat surface or an uneven surface.

The active material compact 2 is a compact formed by connecting multiple porous active material particles 21 in a three-dimensional manner and includes multiple fine pores formed by the multiple active material particles 21 connected with each other. The multiple fine pores form through holes communicating with each other in a network shape in the active material compact 2. That is, the active material compact 2 is a porous body including pores made of the through holes. The active material particle 21 has a particulate shape and includes an active material constituted of a lithium multiple oxide as a transition metal oxide. Meanwhile, in the present specification, the "lithium multiple oxide" refers to an oxide which essentially includes lithium and includes two or more kinds of metal ions as a whole and in which the presence of oxoacid ions is not admitted.

The active material particle 21 includes an inorganic electrode active material (active material) including a lithium multiple oxide as a transition metal oxide as a forming material (constituting material), and the collector 1 can be used as a positive electrode or a negative electrode by appropriately selecting the kind of the forming material.

Examples of the lithium multiple oxide in a case in which the collector 1 is made to serve as a positive electrode include $LiCoO_2$, $LiNiO_2$, $LiMn_2O_4$, $LiNi_{1/3}Co_{1/3}Mn_{1/3}O_2$, $Li_2Mn_2O_3$, $LiNi_{0.8}Co_{0.16}Al_{0.04}O_2$, $LiFePO_4$, $Li_2FeP_2O_7$, $LiMnPO_4$, $LiFeBO_3$, $Li_3V_2(PO_4)_3$, $Li_2CuO_2$, $LiFeF_3$, $Li_2FeSiO_4$, and $Li_2MnSiO_4$. Among these, a multiple oxide including a compound including lithium and at least one of cobalt, manganese, and nickel as a main material is preferred, and specifically, the multiple oxide preferably includes a compound selected from a group consisting of lithium cobalt oxide, nickel-manganese-lithium cobalt oxide, lithium nickel oxide, and nickel-cobalt-lithium aluminum oxide as a main component.

When the above-described lithium multiple oxide is included, the multiple active material particles 21 exchange electrons with each other, the active material particle 21 and the solid electrolyte layer 3 exchange lithium ions with each other, and thus the active material particles serve as an active material.

Therefore, the active material compact 2 can be provided with two characteristics of a high electron-conducting property and a small charge and discharge volume change ratio. As a result, an increase in the capacity and the service life of the lithium secondary battery 100 that uses the electrode assembly 10 can be achieved.

In addition, a solid solution in which a portion of atoms in the crystals of the lithium multiple oxide is substituted with another transition metal, typical metal, alkali metal, alkaline rare earth, lanthanoid, chalcogenide, halogen, or the like is also included in the lithium multiple oxide, and the solid solution can also be used as a positive electrode active material.

In addition, as the forming material of the active material compact 2 in a case in which the collector 1 is made to serve as a negative electrode, it is possible to use, for example, a lithium multiple oxide such as $Li_4Ti_5O_{12}$ or $Li_2Ti_3O_7$ or a material capable of absorbing and storing lithium such as Si, SiO, or Sn as a negative electrode active material.

The average particle diameter of the active material particles 21 is preferably in a range of 300 nm to 5 µm, more preferably in a range of 450 nm to 3 µm, and still more preferably in a range of 500 nm to 1 µm.

In order to provide higher performance to the lithium secondary battery 100, it is necessary to make a larger amount of the solid electrolyte layer 3 present in the pores in the active material compact 2. When the average particle diameter of the active material particles 21 is smaller than the above-described lower limit value, the radius of a fine pore constituting the pore is likely to be as extremely small as several tens of nanometers, and there are cases in which the intrusion of a material for forming the multiple oxide layer 5 and the solid electrolyte layer 3 becomes difficult. As a result, it becomes difficult to fully fill the inside of the fine pores with the multiple oxide layer 5 and the solid electrolyte layer 3, and it becomes difficult to form a high-capacity lithium secondary battery.

When the average particle diameter of the active material particles 21 exceeds the above-described upper limit value, the radius of the fine pore constituting the pore becomes larger, but the specific surface area, which is the surface area per unit mass of the active material compact 2 to be formed, becomes smaller. Therefore, the contact area between the active material compact 2 and the multiple oxide layer 5 and the solid electrolyte layer 3 becomes smaller, and the capacity of the lithium secondary battery becomes smaller.

In the active material compact 2 made of a porous body formed by connecting multiple porous active material particles 21 in a three-dimensional manner, the porosity is preferably in a range of 10% to 50% and more preferably in a range of 30% to 50%. When the active material particles 21 have an average particle diameter in the above-described range, it is possible to set the porosity of the active material compact 2 as described above. In such a case, it is possible to achieve an increase in the capacity of the lithium secondary battery for which the electrode assembly 10 is used.

Meanwhile, the average particle diameter of the active material particles 21 can be measured by, for example, dispersing the active material particles 21 in n-octanol so that the concentration thereof falls into a range of 0.1% by mass to 10% by mass and then obtaining the median radius using a light-scattering particle size distribution measurement instrument (manufactured by Nikkiso Co., Ltd., NANOTRAC UPA-EX250).

The porosity can be measured on the basis of Expression (I) below using, for example, (1) the volume of the active material compact 2 including the fine pores (apparent volume), which is obtained from the external dimensions of the active material compact 2, (2) the mass of the active material compact 2, and (3) the density of the active material constituting the active material compact 2.

Porosity (%)=[1−(the mass of the active material compact/(the apparent volume)×(the density of the active material))]×100          (I)

The solid electrolyte layer 3 is constituted by including a forming material having a lithium ion-conducting property. The solid electrolyte layer 3 and the active material compact 2 are in contact with each other through the multiple oxide layer 5, and the solid electrolyte layer 3 is also present in the pores formed in the active material compact 2. The assembly 4 is provided so that, on a second surface 42 side thereof which comes into contact with the electrode 20, the active material compact 2 and the multiple oxide layer 5 are not exposed and only the solid electrolyte layer 3 is exposed. Therefore, it is possible to prevent short-circuiting between the collector 1 and the electrode 20.

The forming material of a solid electrolyte is not particularly limited, examples thereof include oxides, sulfides, halides, nitrides, and hydroxides such as $Li_{6.75}La_3Zr_{1.75}Nb_{0.25}O_{12}$, $SiO_2$—$SiO_2$—$P_2O_5$—$Li_2O$, $SiO_2$—$P_2O_5$—$LiCl$, $Li_2O$—$LiCl$—$B_2O_3$, $Li_{3.4}V_{0.6}Si_{0.4}O_4$, $Li_{14}ZnGe_4O_{16}$, $Li_{3.6}V_{0.4}Ge_{0.6}O_4$, $Li_{1.3}Ti_{1.7}Al_{0.3}(PO_4)_3$, $Li_{2.88}PO_{3.73}N_{0.14}$, $LiNbO_3$, $Li_{0.35}La_{0.55}TiO_3$, $Li_2S$—$SiS_2$, $Li_2S$—$SiS_2$—$LiI$, $Li_2S$—$SiS_2$—$P_2S_5$, $Li_3N$, $LiI$, $LiI$—$CaI_2$, $LiI$—$CaO$, $LiAlCl_4$, $LiAlF_4$, $LiI$—$Al_2O_3$, $LiF$—$Al_2O_3$, $LiBr$—$Al_2O_3$, $Li_2O$—$TiO_2$, $La_2O_3$—$Li_2O$—$TiO_2$, $Li_3NI_2$, $Li_3N$—$LiI$—$LiOH$, $Li_3N$—$LiCl$, $Li_6Nbr_3$, $LiSO_4$, $Li_4SiO_4$, $Li_3PO_4$-$Li_4siO_4$, $Li_4GeO_4$—$Li_3VO_4$, $Li_4SiO_4$—$Li_3VO_4$, $Li_4GeO_4$—$Zn_2GeO_2$, $Li_4SiO_4$—$LiMoO_4$, $Li_3PO_4$—$Li_4SiO_4$, $Li_4SiO_4$—$Li_4ZrO_4$, $Li_{2+x}C_{1-x}B_xO_3$, $LiBH_4$, $Li_{7-x}PS_{6-x}Cl_x$, $Li_{10}GeP_2S_{12}$, and these forming materials can be used singly or two or more forming materials can be used in a combined form. In addition, these partially-substituted bodies can be used in any form of crystal, amorphous, and partially-crystallized glass. Furthermore, it is also possible to use a compound complexed by implanting fine particles of an insulating substance such as $Al_2O_3$, $SiO_2$, or $ZrO_2$ into the solid electrolyte as the forming material of the solid electrolyte.

In addition, the solid electrolyte is more preferably a solid electrolyte having a garnet-type crystal structure or a garnet-type analogous crystal structure. The solid electrolyte having a garnet-type crystal structure or a garnet-type analogous crystal structure has a high ion-conducting property and is electrochemically stable and thus is preferably used as a solid electrolyte. Therefore, among the above-described forming materials of the solid electrolyte, a material forming a garnet-type crystal structure or a garnet-type analogous crystal structure is more preferably used. In addition, the garnet-type crystal structure or the garnet-type analogous crystal structure is capable of smoothly exchanging lithium ions with a substance having a tetragonal crystal structure.

A specific example of a substance enabling the solid electrolyte to easily have a garnet-type crystal structure or a garnet-type analogous crystal structure is a substance represented by a general formula $Li_xM^1M^2O_{12}$. This substance enables the solid electrolyte to easily have a garnet-type crystal structure or a garnet-type analogous crystal structure. Meanwhile, as $M^1$, an arbitrary element capable of forming a garnet crystal is selected; however, among these arbitrarily-selected elements, particularly, at least one element of Zr, Nb, Ta, Sn, W, Sb, and Bi is preferably used in order to form a crystal having a high ion conductivity. In addition, as $M^2$, an arbitrary element capable of forming a garnet crystal in association with $M^1$ is selected; however, among these arbitrarily-selected elements, particularly, a lanthanoid element is preferably selected and La is more preferably selected in order to form a crystal having a high ion conductivity.

Meanwhile, a solid solution in which a portion of atoms in this composition is substituted with another transition metal, typical metal, alkali metal, alkaline rare earth, lanthanoid, chalcogenide, halogen, or the like can also be used as the solid electrolyte.

In addition, the ion conductivity of the solid electrolyte layer 3 is preferably $1 \times 10^{-5}$ S/cm or higher. When the solid electrolyte layer 3 has the above-described ion conductivity, ions in the solid electrolyte layer 3 at a position away from the surface of the active material compact 2 also reach the surface of the active material compact 2 and become capable of contributing to a battery reaction in the active material compact 2. Therefore, the ratio of utilization of the active material in the active material compact 2 improves, and the capacity can be increased.

Meanwhile, the "ion conductivity of the solid electrolyte layer 3" refers to the "total ion conductivity" which is the sum of the "bulk conductivity" that is a conductivity of the above-described inorganic electrolyte constituting the solid electrolyte layer 3 and the "grain boundary ion conductivity" that is a conductivity between crystal particles in which the inorganic electrolyte is a crystal substance.

Here, the ion conductivity of the solid electrolyte layer 3 can be measured by, for example, sintering a tablet-form compact obtained by pressing solid electrolyte powder at 624 MPa in the atmosphere at 700° C. for eight hours, forming platinum electrodes having a diameter of 0.5 cm and a thickness of 100 nm on both surfaces of the press compact by means of sputtering, and carrying out an alternating impedance method. As a measurement instrument, for example, an impedance analyzer (manufactured by Solartron Analytical, product No. SI1260) is used.

Next, the multiple oxide layer 5 will be described. As described above, the multiple oxide layer 5 is formed in a form so as to cover the active material compact 2. The multiple oxide layer 5 forms a lamellar shape and is also present in the pores in the active material compact 2.

The multiple oxide layer 5 is a compound including at least one of a metal multiple oxide represented by General Formula (II) below and a derivative thereof, and this compound has an excellent electron and lithium ion (ion)-conducting property.

$$Ln_2Li_{0.5}M_{0.5}O_4 \quad (II)$$

(In the formula, Ln represents a lanthanoid element, and M represents a transition metal.)

The multiple oxide layer 5 covers the active material compact 2, and thus the lithium ion conductivity and the electron conductivity of the multiple oxide layer 5 contribute to an increase in the capacity and the output of the lithium secondary battery.

Since the multiple oxide layer 5 functions as a path through which electrons are conducted in the thickness direction of the assembly 4 in the assembly 4 and thus is capable of facilitating the smooth supply of electrons to the collector 1, the internal resistance in the assembly 4 is decreased. In addition, since it is possible to make the multiple oxide layer 5 function as an electron-conducting path as described above, the range of selection of the kind of electrode active material that is used as a material for the active material compact broadens. In addition, since the multiple oxide layer 5 is exposed from the assembly 4 on the first surface 41 and comes into contact with the collector 1, it is possible to more smoothly conduct electrons to the collector 1.

In addition, the multiple oxide layer 5 includes at least one of the metal multiple oxide represented by General Formula (II) below and a derivative thereof and thus has an excellent lithium ion-conducting property. Therefore, it is possible to smoothly exchange lithium ions between the active material compact 2 and the solid electrolyte layer 3.

When the lithium secondary battery includes the multiple oxide layer 5, compared with a case in which the lithium secondary battery only includes the active material compact 2, the electron and lithium ion-conducting property becomes higher, a decrease in the coulombic efficiency due to potential drop is alleviated, and the exchange of lithium ions is stably maintained over a long period of time. Therefore, it is possible to improve the output and the capacity density of the lithium secondary battery 100. The lithium secondary battery 100 becomes capable of stably maintaining a high output and a high capacity over a long period of time.

In addition, as described above, the multiple oxide layer 5 is a layer including at least one of the metal multiple oxide represented by General Formula (II) and a derivative thereof. However, when the derivative forms a cubic crystal, the multiple oxide layer 5 including this derivative also has an excellent electron and lithium ion-conducting property similar to the multiple oxide layer 5 including the metal multiple oxide represented by General Formula (II). That is, the above-described effect can be obtained by forming the multiple oxide layer 5 including a derivative forming a cubic crystal on the surface of the active material compact 2.

Furthermore, Ln in the metal multiple oxide represented by General Formula (II) or a derivative thereof is preferably the same Ln as that in a case in which the solid electrolyte in the solid electrolyte layer 3 includes Ln, and M in the metal multiple oxide represented by General Formula (II) or a derivative thereof is preferably the same transition metal as that in the active material compact 2. In such a case, the multiple oxide layer 5 including at least one of the metal multiple oxide represented by General Formula (II) or a derivative thereof can be provided with excellent adhesiveness to the active material particles 21 and the solid electrolyte layer 3. As a result, from the above-described viewpoint as well, it becomes possible to further facilitate the exchange of electrons between the multiple oxide layer 5 and the active material particles 21 and the exchange of lithium ions between the solid electrolyte layer 3 and the active material particles 21 through the multiple oxide layer 5.

In General Formula (II), Ln represents a lanthanoid element, and, among lanthanoid elements, is preferably at least one of La, Pr, and Nd. Furthermore, in General Formula (II), M represents a transition metal, and, among transition metals, is preferably at least one of Co, Ni, Mn, Fe, and Cu. When the above-described elements are selected as the lanthanoid element and the transition metal, the multiple oxide layer 5 can be provided with a superior electron and lithium ion-conducting property.

Furthermore, examples of the derivative of the metal multiple oxide in which the crystal represented by General Formula (II) forms a tetragonal crystal include $La_2Li_{0.5}Co_{0.5}O_4$, $La_2Li_{0.5}Ni_{0.5}O_4$, $La_2Li_{o0.5}Cu_{0.5}O_4$, $La_{1.5}Sr_{0.5}Li_{0.5}Co_{0.5}O_4$ and $Nd_2Li_{0.5}Ni_{0.5}O_4$.

When the electron conductivity of the multiple oxide layer 5 is higher than the electron conductivity of the active material compact 2, the inclusion of the multiple oxide layer 5 is capable of reliably decreasing the internal resistance in the assembly 4. In order to decrease the internal resistance, the electron conductivity of the multiple oxide layer 5 is preferably $1.2 \times 10^{-5}$ S/cm or higher. In addition, the ion conductivity of the multiple oxide layer 5 is preferably $7 \times 10^7$ S/cm or higher.

In addition, the average film thickness of the multiple oxide layer 5 is preferably in a range of 200 nm to 1000 nm and more preferably in a range of 650 nm to 750 nm. In such a case, it is possible to store the solid electrolyte layer 3 in the pores of the active material compact 2, and the multiple oxide layer can be provided with a superior lithium ion-conducting property.

On the first surface 41 of the assembly 4, the active material compact 2 is exposed from the solid electrolyte layer 3. There are cases in which polishing is carried out on the first surface 41 in order to expose the active material compact 2. In a case in which polishing is carried out, scratch marks (polishing marks) which are marks generated due to polishing remain on the first surface 41.

In addition, in the electrode assembly 10 of the present embodiment, the active material compact 2 can be molded without using an organic substance such as a binder that connects the active material particles or a conduction aid for guaranteeing the conducting property of the active material compact 2, and, in this case, the active material compact is almost constituted only of an inorganic substance. Specifically, in the electrode assembly 10 of the embodiment, when the assembly 4 (the active material compact 2, the solid electrolyte layer 3, and the multiple oxide layer 5) is heated at 400° C. for 30 minutes, the mass reduction ratio reaches 5% by mass or less. The mass reduction ratio is preferably 3% by mass or less, more preferably 1% by mass or less, and particularly preferably unobservable or within a permissible error range. Since the assembly 4 has the above-described mass reduction ratio, the content of a substance such as a solvent or adsorbed water that evaporates under a predetermined heating condition or an organic substance that is combusted or oxidized and thus is gasified under a predetermined heating condition in the assembly 4 is only 5% by mass or lower with respect to the entire constitution.

Meanwhile, the mass reduction ratio of the assembly 4 can be computed from the ratio between the mass before heating and the mass after heating using a thermogravimetric-differential thermal analyzer (TG-DTA) by heating the assembly 4 under a predetermined heating condition and then measuring the mass of the assembly 4 after heating under the predetermined heating condition.

For the above-described reasons, the electrode assembly 10 forming the above-described constitution which is manufactured using a manufacturing method of the embodiment described below is capable of improving the capacity of a lithium secondary battery for which the electrode assembly 10 is used and of increasing the output thereof.

In addition, in the assembly 4, the active material compact 2, the solid electrolyte layer 3, and the multiple oxide layer 5 are exposed on the first surface 41, and only the solid electrolyte layer 3 is exposed on the second surface 42, and, in this state, the collector 1 is joined to the first surface 41, and the electrode 20 is joined to the second surface 42. When the above-described constitution is formed, it is possible to prevent the coupling between the electrode 20 and the collector 1 through the active material compact 2, that is, short-circuiting in the lithium secondary battery 100. That is, the solid electrolyte layer 3 also functions as a short-circuiting prevention layer that prevents the occurrence of short-circuiting in the lithium secondary battery 100.

The electrode 20 is provided on the second surface 42 that is on the opposite side of the assembly 4 to the collector 1 in contact with the solid electrolyte layer 3 without coming into contact with the active material compact 2. In a case in which the active material compact 2 is constituted of a positive electrode active material, the electrode 20 functions as a negative electrode. In addition, in a case in which the active material compact 2 is constituted of a negative electrode active material, the electrode functions as a positive electrode.

In a case in which the electrode 20 is a negative electrode, examples of the forming material (constituting material) of the electrode 20 include lithium (Li). In a case in which the electrode is a positive electrode, examples of the forming material thereof include aluminum (Al).

The thickness of the electrode 20 is not particularly limited, and is, for example, preferably in a range of 1 μm to 100 μm and more preferably in a range of 20 μm to 50 μm.

In addition, in a case in which the electrode 20 is a negative electrode, a negative electrode layer including a negative electrode active material as a main material may be interposed between the solid electrolyte layer 3 and the electrode 20. Examples of the negative electrode active material include lithium multiple oxides such as $Nb_2O_5$, $V_2O_5$, $TiO_2$, $In_2O_3$, $ZnO$, $SnO_2$, $NiO$, ITO (Sn-added indium oxide), AZO (aluminum-added zinc oxide), GZO (gallium-added zinc oxide), ATO (antimony-added tin oxide), FTO (fluorine-added tin oxide), an anatase phase of $TiO_2$, $Li_4Ti_5O_{12}$, and $Li_2Ti_3O_7$, metals such as Si, Sn, Si—Mn, Si—Co, and Si—Ni and alloys thereof, carbon materials, and substances including lithium ions interposed between carbon material layers.

Next, methods for manufacturing the electrode assembly 10 and the lithium secondary battery 100 will be described.

First, the method for manufacturing the electrode assembly 10 will be described using FIGS. 3A to 6C.

First, multiple active material particles 21 having a particulate shape are heated and thus are connected with each other in a three-dimensional manner, thereby obtaining the active material compact 2 made of a porous body (first step).

Figure 3A:
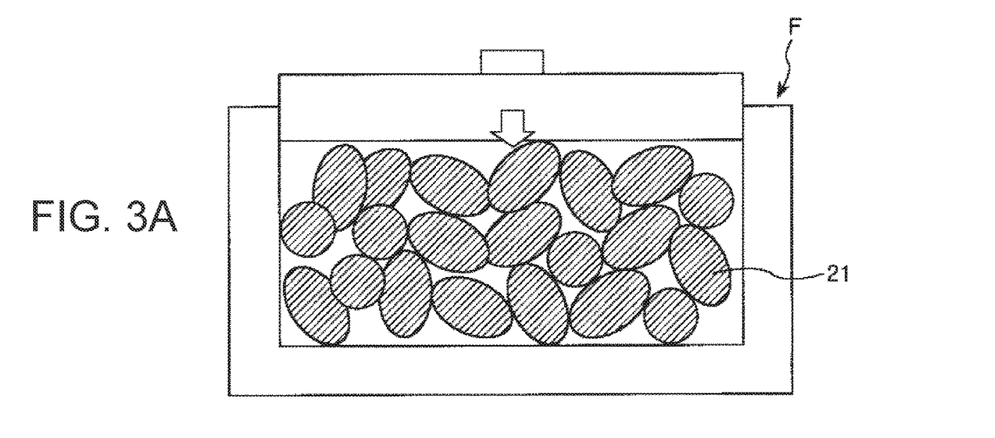
FIGS. 3A and 3B are views for describing a method for manufacturing the lithium secondary battery shown in FIG. 2.
Figure 3B:
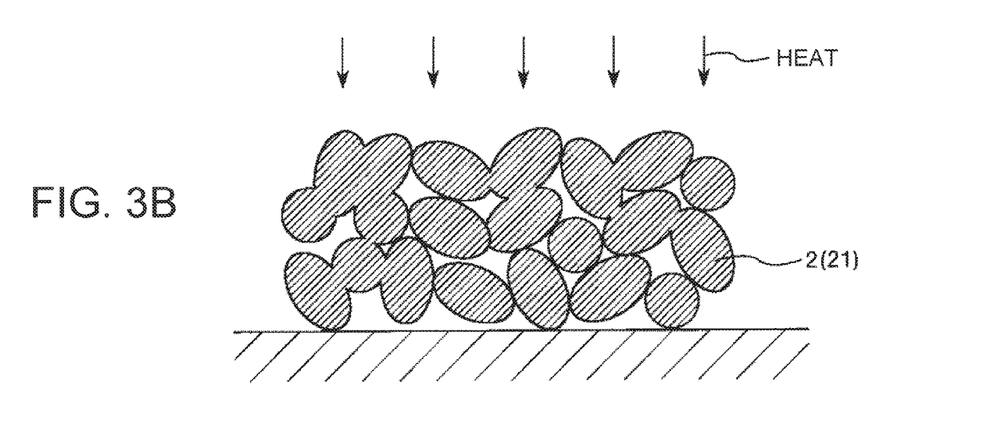

The active material compact 2 is formed by, for example, as shown in FIGS. 3A and 3B, compressing multiple active material particles 21 using a molding die F so as to mold a compression molding substance (refer to FIG. 3A) and then thermally treating (first thermal treatment) the obtained compression molding substance so as to connect the multiple active material particles 21 with each other in a three-dimensional manner (refer to FIG. 3B).

The first thermal treatment is preferably carried out under a temperature condition in a range of 850° C. to 1000° C. In such a case, the active material particles 21 are sintered, whereby an integrated active material compact 2 can be reliably obtained. At this time, when the treatment temperature is lower than 850° C., there is a concern that the sintering may be insufficient depending on the kind of the lithium multiple oxide being used and the electron-conducting property in the crystal of the active material may become lower. In addition, when the treatment temperature exceeds 1000° C., lithium ions excessively volatilize from the crystal of the lithium multiple oxide, and the electron-conducting property of the lithium multiple oxide degrades.

Meanwhile, the treatment temperature is preferably in a range of 850° C. to 1000° C. in order to obtain more appropriate output and capacity, more preferably in a range of 875° C. to 1000° C. in order to obtain still more appropriate output and capacity, and still more preferably in a range of 900° C. to 920° C. in order to obtain still more appropriate output and capacity.

In addition, the first thermal treatment is preferably carried out for 5 minutes to 36 hours and more preferably carried out for 4 hours to 14 hours.

When the above-described thermal treatment is carried out, the growth of grain boundaries in the active material particles 21 or sintering between the active material particles 21 proceeds, and thus it becomes easy to maintain the shape of the active material compact 2 to be obtained, and the amount of a binder added to the active material compact 2 can be decreased. In addition, a bond between the active material particles 21 is formed due to sintering, and it is possible to form a migration path for electrons between the active material particles 21.

In addition, the active material compact 2 to be obtained is constituted of through holes formed of multiple pores in the active material compact 2 which communicate with each other in a network shape.

In addition, as a forming material that is used to form the active material particle 21, an organic macromolecular compound such as polyvinylidene fluoride (PVDF) or polyvinyl alcohol (PVA) may be added as a binder. This binder is combusted and oxidized during the thermal treatment in the present step, and the amount thereof decreases.

In addition, to the forming material used to form the active material particles 21, a particulate pore-forming material in which a macromolecule or carbon powder is used as a forming material is preferably added as a casting die of fine pores during powder compacting molding. When the pore-forming material is mixed into the forming material, it becomes easy to control the porosity of the active material compact. This pore-forming material is combusted or oxidized during the thermal treatment and thus is decomposed and removed, and thus the amount thereof decreases in the active material compact to be obtained. The average grain diameter of the pore-forming material is preferably in a range of 0.5 µm to 10 µm.

Furthermore, the pore-forming material preferably includes particles including a deliquescent substance as a forming material (first particles). Since water generated around the first particles when the first particles deliquesce functions as a binder that connects lithium multiple oxide particles together, it becomes possible to maintain the shape of the particulate lithium multiple oxide while the lithium multiple oxide is compressed and thermally treated. Therefore, it is possible to obtain the active material compact without adding another binder or while decreasing the amount of the binder added, and a high-capacity electrode assembly can be easily produced. Examples of the deliquescent particles include polyacrylic acid.

In addition, the pore-forming material preferably further includes particles including a non-deliquescent substance as a forming material (second particles). Water is generated around the first particles, but there are cases in which this water causes the porosity of the active material compact to deviate from a desired set value. Therefore, when the pore-forming material includes the second particles together with the first particles, it becomes possible to suppress the deviation of the porosity while maintaining the function of the first particles as a binder.

Figure 4A:
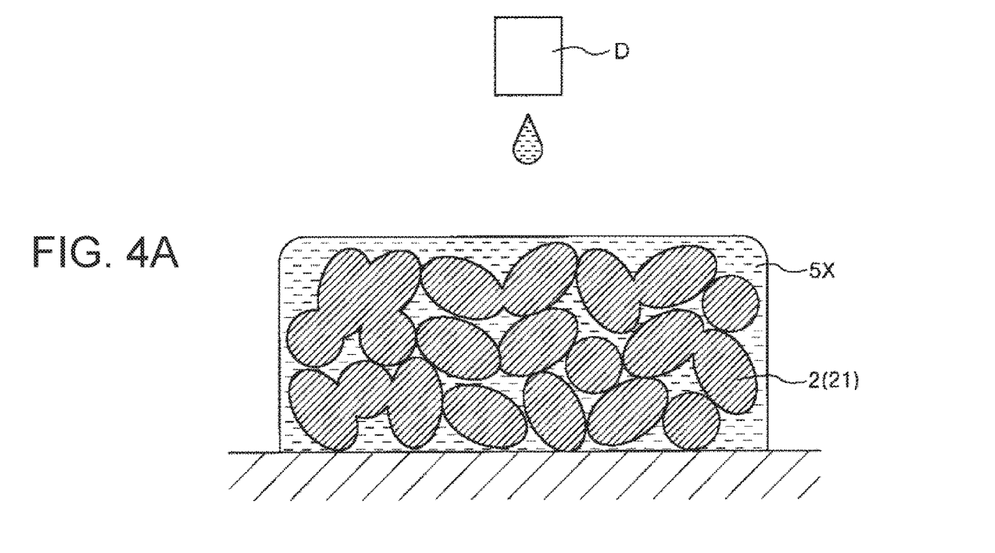
FIGS. 4A and 4B are views for describing a method for manufacturing the lithium secondary battery shown in FIG. 2.
Figure 4B:
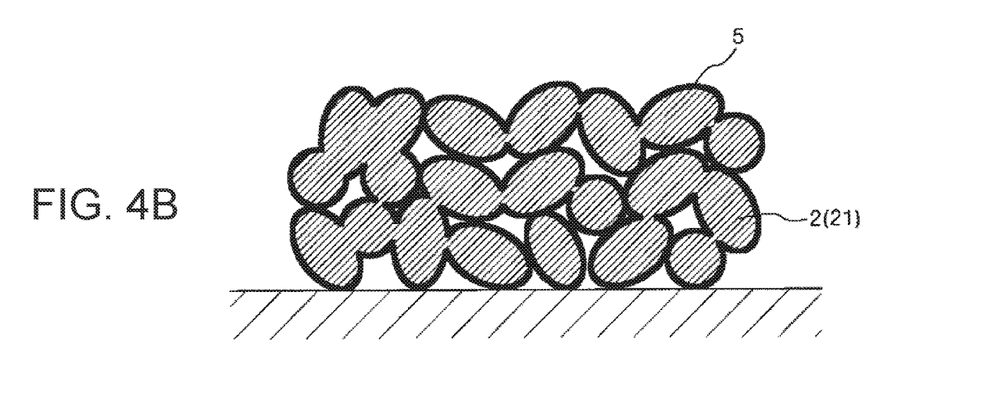

Next, as shown in FIGS. 4A and 4B, the multiple oxide layer 5 is formed so as to cover the surface of the active material compact 2 (active material particles 21) (second step).

That is, in the active material compact 2, the multiple oxide layer 5 is selectively formed on the surfaces of the active material particles 21 exposed in the pores (through holes) in the active material compact 2 without covering a region in which the active material particles 21 come into contact with each other.

Regarding the formation of the multiple oxide layer 5, for example, as shown in FIGS. 4A and 4B, a liquid-form body 5X including a precursor of the metal multiple oxide represented by General Formula (II) or a derivative thereof is applied onto the surface of the active material compact 2 including the inside of the through holes in the active material compact 2 (FIG. 4A), and then is fired (heated), thereby forming the multiple oxide layer 5 on the surface of the active material compact 2 using the precursor as the metal multiple oxide represented by General Formula (II) or a derivative thereof (FIG. 4B).

The liquid-form body 5X may include, in addition to the precursor, a solvent capable of dissolving the precursor. In a case in which the liquid-form body 5X includes a solvent, the solvent may be appropriately removed after the application of the liquid-form body 5X and before the firing. The solvent can be removed by employing one ordinarily-known method such as heating, depressurization, or blasting or a combination of two or more methods.

Here, since the multiple oxide layer 5 is formed by applying the fluid liquid-form body 5X, it becomes possible to form a favorable multiple oxide layer 5 even on the internal surface of the fine pores in the fine active material compact 2. Therefore, it is possible to form the multiple oxide layer 5 so as to cover the surfaces of the active material particles 21 exposed in the through holes in the active material compact 2.

The liquid-form body 5X can be applied using a variety of methods as long as the methods enable the liquid-form body 5X to intrude into the fine pores in the active material compact 2. For example, the liquid-form body 5X may be added dropwise onto a position at which the active material compact 2 is mounted, the active material compact 2 may be immersed in a position storing the liquid-form body 5X, or the liquid-form body 5X may be impregnated into the fine pores using a capillary phenomenon by bringing an end portion of the active material compact 2 into contact with a position storing the liquid-form body 5X. FIG. 4A shows that, among the above-described methods, the liquid-form body 5X is added dropwise using a dispenser D.

In addition, examples of the precursor of the metal multiple oxide represented by Formula (II) or a derivative thereof include (A1), (A2), and (A3) below.

(A1) A composition which includes a metal atom in the metal multiple oxide represented by Formula (II) or a derivative thereof in a proportion in accordance with the composition formula thereof and a salt that turns into the metal multiple oxide represented by Formula (II) or a derivative thereof due to oxidization.

(A2) A composition including a metal alkoxide which includes a metal atom in the metal multiple oxide represented by Formula (II) or a derivative thereof in a proportion in accordance with the composition formula thereof.

(A3) A dispersion fluid obtained by dispersing a fine particle sol including fine particles of the metal multiple oxide represented by Formula (II) or a derivative thereof or a metal atom in the metal multiple oxide represented by Formula (II) or a derivative thereof in a proportion in accordance with the composition formula thereof or a metal atom in the metal multiple oxide represented by Formula (II) or a derivative thereof in a solvent, (A1), or (A2).

Meanwhile, a metal complex may be included as the salt in (A1). In addition, (A2) is a precursor in a case in which the metal multiple oxide represented by Formula (II) or a derivative thereof is formed using a so-called sol-gel method.

The precursor is fired in the atmosphere at a temperature lower than that of the thermal treatment for obtaining the active material compact 2. Specifically, the firing temperature is preferably in a range of 300° C. to 700° C. In such a case, the metal multiple oxide represented by Formula (II) or a derivative thereof is generated from the precursor by means of firing, and the multiple oxide layer 5 is formed.

When the precursor is fired in the above-described temperature range, in the interface between the active material particle 21 and the multiple oxide layer 5 in the active material compact 2, a solid-phase reaction is caused due to the mutual diffusion of elements respectively constituting the active material particles and the multiple oxide layer, and it is possible to suppress the generation of an electrochemically inactive byproduct. In addition, the crystallinity of the metal multiple oxide represented by Formula (II) or a derivative thereof improves, and it is possible to improve the ion-conducting property of the multiple oxide layer 5. Additionally, in the interface between the active material particle 21 and the multiple oxide layer 5, some portions are sintered, and the migration of charges in the interface becomes easy. Therefore, the capacity or output of the lithium secondary battery 100 improves.

Meanwhile, in the interface between the active material particle 21 and the multiple oxide layer 5, from the viewpoint of the mutual diffusion of elements respectively constituting the active material particles and the multiple oxide layer, M in the metal multiple oxide represented by General Formula (II) or a derivative thereof is preferably the same transition metal as that in the active material compact 2. In such a case, the multiple oxide layer 5 is formed due to the mutual diffusion of the same metal M (transition metal) elements in the active material particles and the multiple oxide layer, and thus the multiple oxide layer 5 can be provided with excellent adhesiveness to the active material particles 21.

In addition, the precursor may be fired by means of a single thermal treatment or may be fired by means of a first thermal treatment for adhering the precursor to the surface of the porous body and a second thermal treatment for heating the precursor under a temperature condition of the treatment temperature of the first thermal treatment or higher and 700° C. or lower. When the precursor is fired by means of the above-described stepwise thermal treatment, it is possible to easily form the multiple oxide layer 5 at a desired position.

Figure 5A:
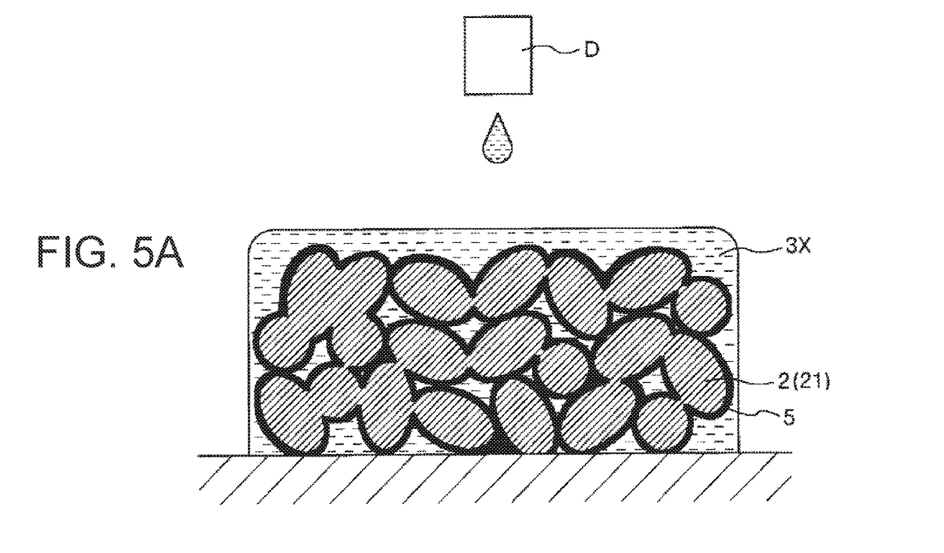
FIGS. 5A and 5B are views for describing a method for manufacturing the lithium secondary battery shown in FIG. 2.
Figure 5B:
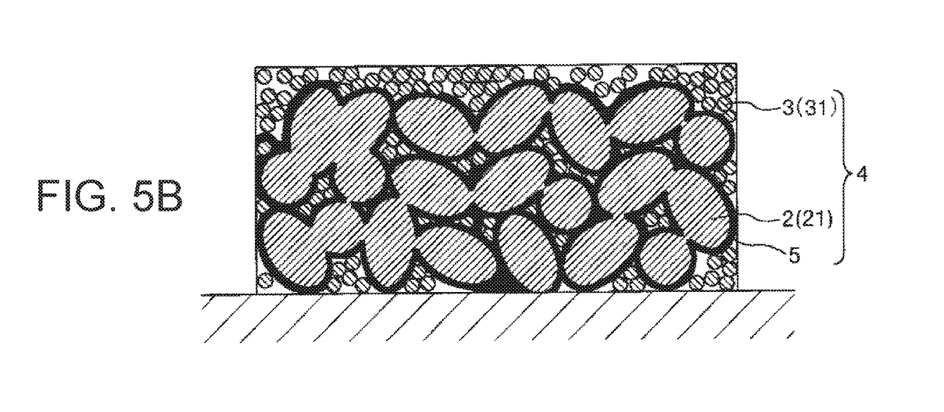

Next, as shown in FIGS. 5A and 5B, a liquid-form body 3X including a precursor of the solid electrolyte is applied onto the multiple oxide layer 5 formed on the surface of the active material compact 2 including the inside of the through holes in the active material compact 2 (FIG. 5A), and then is fired (heated), thereby forming the solid electrolyte layer 3 made of particulate bodies 31 using the precursor as an inorganic solid electrolyte (FIG. 5B; third step).

In such a case, the solid electrolyte layer 3 is formed on the multiple oxide layer 5 selectively covered with the surfaces of the active material particles 21 exposed in the pores (through holes) in the active material compact 2, and consequently, the assembly 4 including the active material compact 2, the solid electrolyte layer 3, and the multiple oxide layer 5 is formed.

The liquid-form body 3X may include, in addition to the precursor, a solvent capable of dissolving the precursor. In a case in which the liquid-form body 3X includes a solvent, the solvent may be appropriately removed after the application of the liquid-form body 3X and before the firing. The solvent can be removed by employing one ordinarily-known method such as heating, depressurization, or blasting or a combination of two or more methods.

Here, since the solid electrolyte layer 3 made of the particulate bodies 31 is formed by applying the fluid liquid-form body 3X, it becomes possible to form a favorable solid electrolyte even on the multiple oxide layer 5 formed on the internal surface of the fine pores in the fine active material compact 2. Therefore, it is easy to enlarge the contact area between the active material compact 2 and the solid electrolyte layer 3 through the multiple oxide layer 5, the current density in the interface between the active material compact 2 and the solid electrolyte layer 3 through the multiple oxide layer 5 is decreased, and consequently, a great output can be easily obtained.

The liquid-form body 3X can be applied using a variety of methods as long as the methods enable the liquid-form body 3X to intrude into the fine pores in the active material compact 2. For example, the liquid-form body 3X may be added dropwise onto a position at which the active material compact 2 is mounted, the active material compact 2 may be immersed in a position storing the liquid-form body 3X, or the liquid-form body 3X may be impregnated into the fine pores using a capillary phenomenon by bringing an end portion of the active material compact 2 into contact with a position storing the liquid-form body 3X. FIG. 5A shows that, among the above-described methods, the liquid-form body 3X is added dropwise using a dispenser D.

Furthermore, examples of the precursor of the solid electrolyte include (B1), (B2), and (B3) below.

(B1) A composition which includes a metal atom in the inorganic solid electrolyte in a proportion in accordance with the composition formula of the inorganic solid electrolyte and a salt that turns into the inorganic solid electrolyte due to oxidization.

(B2) A composition including a metal alkoxide which includes a metal atom in the inorganic solid electrolyte in a proportion in accordance with the composition formula of the inorganic solid electrolyte.

(B3) A dispersion fluid obtained by dispersing a fine particle sol including inorganic solid electrolyte fine particles or a metal atom in the inorganic solid electrolyte in a proportion in accordance with the composition formula of the inorganic solid electrolyte in a solvent, (B1), or (B2).

Meanwhile, a metal complex may be included as the salt in (B1). In addition, (B2) is a precursor in a case in which the inorganic solid electrolyte is formed using a so-called sol-gel method.

The precursor is fired in the atmosphere at a temperature lower than that of the thermal treatment for obtaining the active material compact 2. Specifically, the firing temperature is preferably in a range of 300° C. to 700° C. In such a case, the inorganic solid electrolyte is generated from the precursor by means of firing, and the solid electrolyte layer 3 is formed.

When the precursor is fired in the above-described temperature range, in the interface between the multiple oxide layer 5 formed on the surfaces of the active material particles 21 and the solid electrolyte layer 3, a solid-phase reaction is caused due to the mutual diffusion of elements respectively constituting the multiple oxide layer and the solid electrolyte layer, and it is possible to suppress the generation of an electrochemically inactive byproduct. In addition, the crystallinity of the inorganic solid electrolyte improves, and it is possible to improve the ion-conducting property of the solid electrolyte layer 3. Additionally, in the interface between the multiple oxide layer 5 and the solid electrolyte layer 3, some portions are sintered, and the migration of charges in the interface becomes easy. Therefore, the capacity or output of the lithium secondary battery 100 improves.

Meanwhile, in the interface between the solid electrolyte layer 3 and the multiple oxide layer 5, from the viewpoint of the mutual diffusion of elements respectively constituting the solid electrolyte layer and the multiple oxide layer, it is preferable that a solid electrolyte including Ln is used as the solid electrolyte in the solid electrolyte layer 3 and Ln in this solid electrolyte is the same Ln as that in the metal multiple oxide represented by General Formula (II) or a derivative thereof. In such a case, when the solid electrolyte layer 3 is formed using the precursor of the solid electrolyte, the solid electrolyte layer 3 is formed due to the mutual diffusion of the same metal Ln elements in the solid electrolyte layer and the multiple oxide layer, and thus the solid electrolyte layer 3 can be provided with excellent adhesiveness to the multiple oxide layer 5. Meanwhile, examples of the forming material of the solid electrolyte layer 3 include $Li_7La_3Zr_2O_{12}$ and $Li_{6.75}La_3Zr_{1.75}Nb_{0.25}O_{12}$.

In addition, the precursor may be fired by means of a single thermal treatment or may be fired by means of a first thermal treatment for adhering the precursor to the surface of the porous body and a second thermal treatment for heating the precursor under a temperature condition of the treatment temperature of the first thermal treatment or higher and 700° C. or lower. When the precursor is fired by means of the above-described stepwise thermal treatment, it is possible to easily form the solid electrolyte layer 3 at a desired position.

Figure 6A:
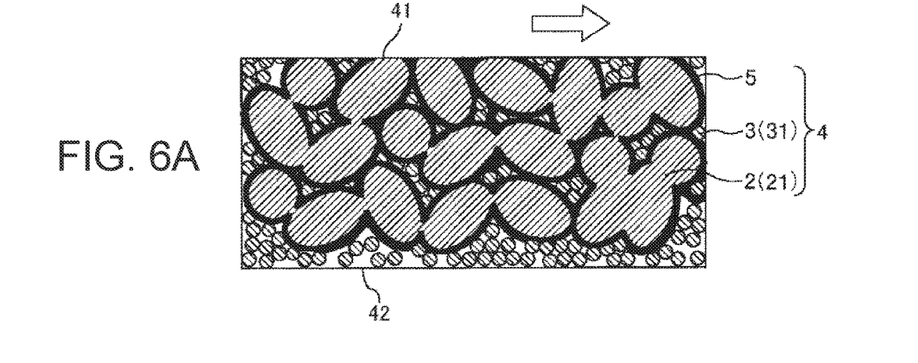
FIGS. 6A to 6C are views for describing a method for manufacturing the lithium secondary battery shown in FIG. 2.

Next, the active material compact 2 and the solid electrolyte layer 3 are exposed on the first surface 41 by grinding and polishing the first surface 41 of the assembly 4 (refer to FIG. 6A). Furthermore, at this time, the multiple oxide layer 5 is also preferably exposed as shown in FIG. 6A. In addition, in this case, scratch marks (grinding and polishing marks) which are marks generated due to grinding and polishing remain on the first surface 41.

Meanwhile, when the assembly 4 is formed, there are cases in which both the active material compact 2 and the solid electrolyte layer 3 are exposed on the first surface 41. In this case, it is also possible to skip the grinding and polishing of the first surface 41 of the assembly 4.

Figure 6B:
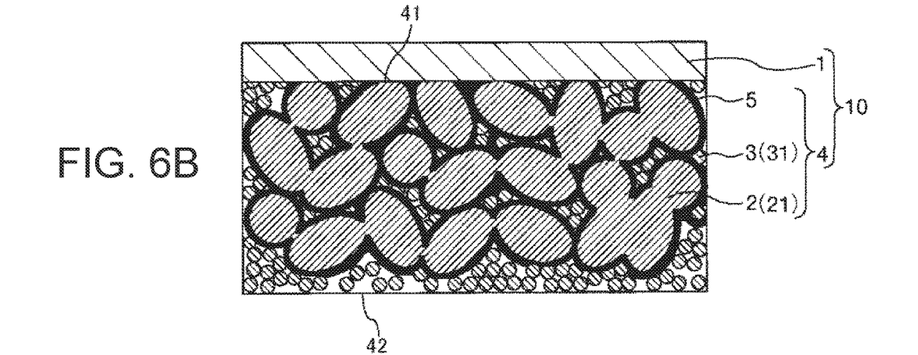

Next, as shown in FIG. 6B, the collector 1 is formed on the first surface 41 of the assembly 4 (fourth step).

Therefore, the electrode assembly (the electrode assembly according to the invention) 10 including the active material compact 2, the solid electrolyte layer 3, the multiple oxide layer 5, and the collector 1 is formed.

The collector 1 may be joined by joining a collector which is formed as a separate body to the first surface 41 of the assembly 4 or by forming the collector 1 on the first surface 41 of the assembly 4.

Meanwhile, as a method for forming the collector 1, a variety of physical vapor depositions (PVD) and chemical vapor depositions (CVD) can be used.

Using the above-described methods, the electrode assembly 10 can be formed.

Figure 6C:
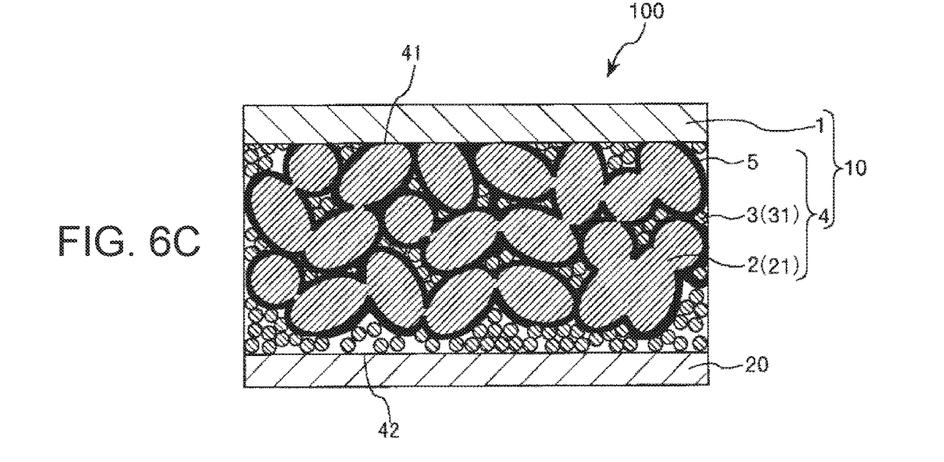

Next, as shown in FIG. 6C, the electrode 20 is joined to the second surface 42 of the assembly 4. The electrode 20 may be joined by joining an electrode which is formed as a separate body to the second surface 42 of the assembly 4 or by forming the forming material of the electrode 20 on the second surface 42 of the assembly 4. Meanwhile, as a method for forming the electrode 20, the same method as that described as the method for forming the collector 1 can be used. Therefore, the lithium secondary battery 100 is manufactured.

Meanwhile, the active material compact 2 can be obtained by molding the active material particles 21 by means of compression and then heating the active material particles as described above or by heating a slurry obtained by dispersing the active material particles 21 in a solvent.

The method in which a slurry is used includes a preparation step of preparing a slurry including the active material particles 21 and a drying step of obtaining the active material compact 2 by heating the slurry. Hereinafter, these steps will be described.

First, a binder is dissolved in a solvent, and the active material particles 21 are dispersed in the solution, thereby preparing a slurry 26. Meanwhile, a dispersant such as oleylamine may be added to the slurry 26.

Figure 7:
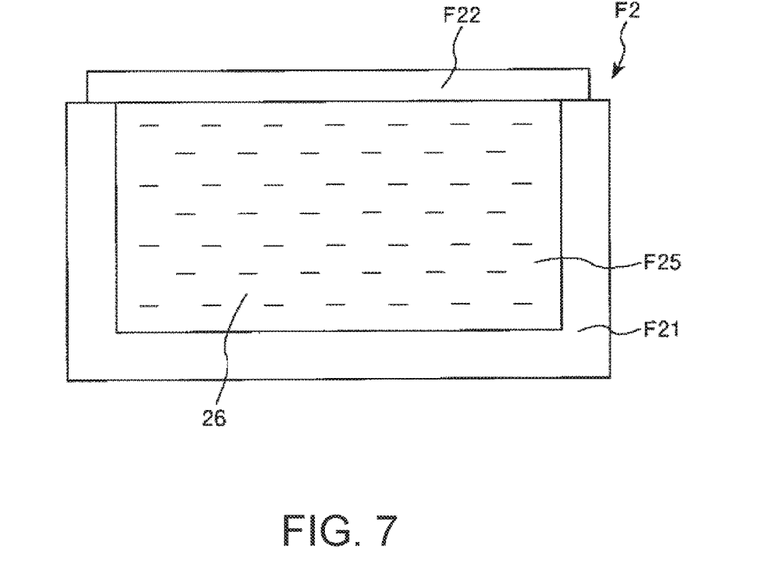
FIG. 7 is a view for describing a method for manufacturing the lithium secondary battery shown in FIG. 2.

After that, a molding die F2 including a bottom portion F21 having a recess portion F25 and a lid portion F22 is prepared, the slurry 26 is added dropwise to the recess portion F25 of the bottom portion F21, and then the bottom portion F21 is covered with the lid portion F22 (refer to FIG. 7).

In addition, the content of the active material particles 21 in the slurry 26 is preferably in a range of 10 wt % to 60 wt % and more preferably in a range of 30 wt % to 50 wt %. In such a case, the active material compact 2 having a high filling ratio with the solid electrolyte can be obtained.

Furthermore, the binder is not particularly limited, and examples thereof include cellulose-based binders, acrylic binders, polyvinyl alcohol-based binders, and polyvinyl butyral-based binders in addition to polycarbonates such as polypropylene carbonate (PPC). One of these binders can be used singly, or two or more binders can be used in a combined form.

In addition, the solvent is not particularly limited and is, for example, preferably an aprotonic solvent. In such a case, it is possible to alleviate the deterioration of the active material particles 21 caused by the contact with the solvent.

Specific examples of the aprotonic solvent include butanol, ethanol, propanol, methyl isobutyl ketone, 1, 4-dioxane, toluene, and xylene, and one or a mixture of these solvents can be used as the solvent.

Next, the slurry 26 including the active material particles 21 is heated so as to dry the slurry 26 and sinter the active material particles 21 in the slurry 26, thereby obtaining the active material compact 2.

Meanwhile, a method for heating the slurry 26 including the active material particles 21 is not particularly limited, and examples thereof include a method in which the slurry 26 is heated by spraying and drying the slurry 26 using a spray dryer or the like.

In addition, the heating conditions for heating the slurry 26 are set to be the same as the conditions for thermally treating the compression molding substance.

Furthermore, the slurry 26 is preferably heated in a stepwise manner in which the temperature condition increases in a stepwise manner, and specifically, the slurry is preferably dried at room temperature, then, is heated up to 300° C. from room temperature for two hours, heated up to 350° C. for 0.5 hours, heated up to 1000° C. for two hours, and then is fired at 1000° C. for eight hours with the recess portion F25 covered with the lid portion F22. When the slurry is heated under the above-described condition, it is possible to reliably burn away the binder in the solvent.

The active material compact 2 can also be obtained by undergoing the above-described steps.

Second Embodiment

The present embodiment relates to an electrode assembly different from the electrode assembly described in the first embodiment. Meanwhile, in the following embodiments including the embodiment and examples, the same constitutional elements as those in the first embodiment will be given the same reference number and, in some cases, will not be described.

Figure 8:
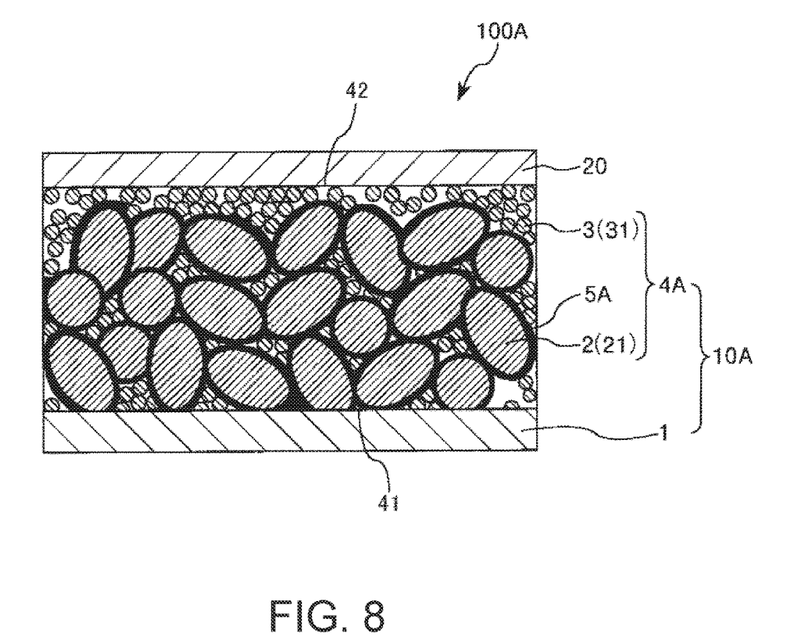
FIG. 8 is a vertical sectional view of a lithium secondary battery for which an electrode assembly according to a second embodiment is used.

FIG. 8 shows a vertical sectional view of an electrode assembly 10A in the embodiment. The electrode assembly 10A includes a different type of active material compact 2 from the active material compact 2 in the first embodiment.

The active material compact 2 is formed by connecting multiple active material particles 21 having a surface covered with the multiple oxide layer 5. Therefore, in the active material compact 2 in the first embodiment, the active material particles 21 are directly connected with each other; however, in the active material compact 2 in the embodiment, the active material particles 21 are coupled with each other through the multiple oxide layer 5. The electrode assembly 10A in the embodiment has the same configuration as the electrode assembly 10 in the first embodiment in other portions.

Inside a connection hole of the active material compact 2 or around the active material compact 2, the solid electrolyte layer 3 is formed in contact with the active material compact 2. The collector 1 is formed on the first surface 41 of the assembly 4A including the active material compact 2. In addition, as shown in FIG. 8, the electrode 20 is formed on the second surface 42 of the assembly 4A, whereby the lithium secondary battery 100A is formed.

Third Embodiment

Figure 9:
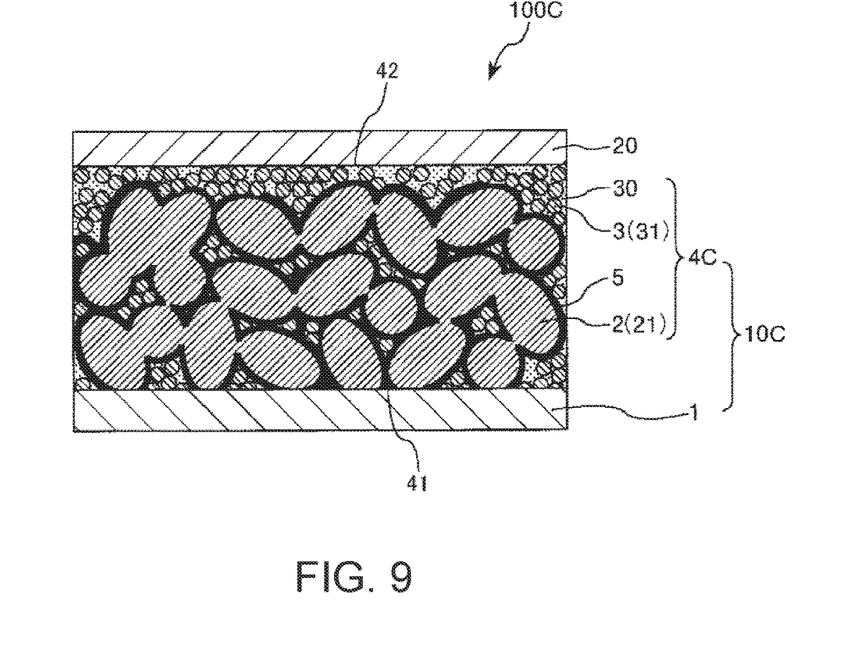
FIG. 9 is a vertical sectional view showing a third embodiment in which a battery according to the invention is applied to a lithium secondary battery.

FIG. 9 is a view showing a vertical sectional view of a lithium secondary battery 100C to which an electrode assembly 10C according to the present embodiment is applied.

The electrode assembly 10C includes the active material compact 2, the solid electrolyte layer 3, an assembly 4C including a filling layer 30 and the multiple oxide layer 5, and the collector 1. The assembly 4C has the same constitutional elements as the assembly 4 except for the fact of including the filling layer 30.

The filling layer 30 is formed of a solid electrolyte which conducts lithium ions and is amorphous (glassy) at room temperature. The filling layer 30 is formed of, for example, a lithium oxide which has a lithium ion-conducting property and includes C, Si, or B. Specifically, the filling layer 30 may include at least one or more of $Li_2CO_3$, $Li_4SiO_4$, $Li_{2+x}C_{1-x}B_xO_3$ (0.1<x<0.4) and $Li_3BO_3$.

The filling layer 30 is used in order to decrease the volume of pores in a case in which the solid electrolyte layer 3 alone is not capable of preventing the formation of the pores. Therefore, the volume shrinkage of the filling layer 30 due to the heating of the precursor is preferably smaller than the volume shrinkage of the solid electrolyte layer 3 due to the heating of the precursor.

Therefore, the filling layer 30 can be formed using a method in which, after the formation of the solid electrolyte layer 3, a fluid precursor solution of the filling layer 30, that is, a precursor solution of the solid electrolyte which is amorphous at room temperature is impregnated into remaining pores, and is then heated.

In addition, the filling layer 30 is preferably a layer that can be formed at a temperature that is approximately the same as or lower than the temperature for forming the solid electrolyte layer 3. This is because the mutual diffusion between the solid electrolyte layer 3 and the filling layer 30 is suppressed. An exemplary case that can be considered is that $Li_7La_3Zr_2O_{12}$ is used as the solid electrolyte layer 3 and $Li_3BO_3$ is used as the filling layer 30. In this case, the firing temperature when the solid electrolyte layer 3 is formed is approximately 700° C.; however, when the firing temperature when the filling layer 30 is formed exceeds 900° C., there is a concern that the mutual diffusion between the solid electrolyte layer 3 and the filling layer 30 may occur. In addition, similar to the precursor of the solid electrolyte layer 3, any one of (B1) to (B3) may be used as the precursor of the filling layer 30. This precursor is diluted with a solvent (for example, an alcohol-based compound), thereby obtaining the precursor solution. This precursor solution is impregnated into remaining pores. A method for impregnating the precursor solution is the same as that described in the section of the solid electrolyte layer 3.

In addition, the heating temperature at which the precursor solution filling the pores is heated is set to, for example, 300° C. or higher and 450° C. or lower.

When the electrode assembly 10C including the assembly 4C is used, it is possible to improve the characteristics of the lithium secondary battery 100C.

Fourth Embodiment

Figure 10:
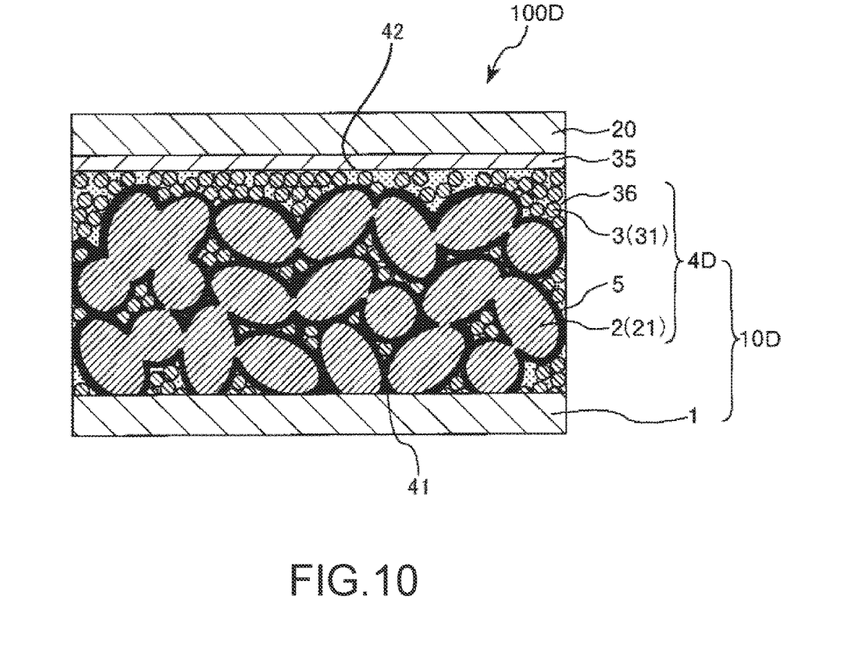
FIG. 10 is a vertical sectional view showing a fourth embodiment in which a battery according to the invention is applied to a lithium secondary battery.

FIG. 10 shows a vertical sectional view of a lithium secondary battery 100D according to the present embodiment. The lithium secondary battery 100D includes, as the constitutional elements, an electrode assembly 10D including an assembly 4D, the electrode 20, and an electrolytic solution-impregnated layer 35 between the electrode assembly 10D and the electrode 20.

The assembly 4D is obtained by impregnating an electrolytic solution 36 into pores remaining after the formation of the solid electrolyte layer 3. In such a case, in a portion in which the multiple oxide layer 5 is not in contact with the solid electrolyte layer 3, the electrolytic solution 36 comes into contact with the multiple oxide layer 5.

In the lithium secondary battery 100D, the assembly 4D includes the active material compact 2 constituted of a porous body including pores, the multiple oxide layer 5 that covers the surfaces of the active material particles 21 exposed in the pores in the active material compact 2, the solid electrolyte layer 3 provided on the surface of the active material compact 2 including the inside of the pores in the active material compact 2 through the multiple oxide layer 5, the electrolytic solution 36 filling pores left due to the formation of the solid electrolyte layer 3 and the multiple oxide layer 5, and the electrolytic solution-impregnated layer 35 joined to both the solid electrolyte layer 3 and the electrode 20. In other words, the assembly 4D further includes the electrolytic solution 36 filling the pores remaining in the assembly 4D of the first embodiment and the electrolytic solution-impregnated layer 35 provided between the assembly 4D and the electrode 20.

In this assembly 4D, the electrolytic solution-impregnated layer 35 is provided between the assembly 4D and the electrode 20, and the electrolytic solution 36 supplied from this electrolytic solution-impregnated layer 35 fills the remaining pores. Therefore, it is possible to reliably prevent a decrease in the ion conductivity between the active material compact 2 and the solid electrolyte layer 3 through the multiple oxide layer 5 which is caused by a decrease in the contact area between the active material compact 2 and the solid electrolyte layer 3 through the multiple oxide layer 5 and an increase in the resistance between the active material compact 2 and the solid electrolyte layer 3 through the multiple oxide layer 5 in the pores.

In addition, generally, when a charge and discharge cycle is repeated in a lithium secondary battery, there are cases in which the volume of the active material compact or the solid electrolyte layer fluctuates. In contrast, in the embodiment, for example, even when the volume shrinks and thus pores broaden, the electrolytic solution flows out from the electrolytic solution-impregnated layer 35, and the pores are filled with the electrolytic solution 36. On the other hand, even when the volume enlarges and thus pores narrow, the electrolytic solution 36 in the pores flows into the electrolytic solution-impregnated layer 35. As described above, the pores in the assembly 4D serve as buffering spaces that absorb a volume fluctuation, and a conduction path of charges is secured. That is, it is possible to obtain a high-output lithium secondary battery.

Meanwhile, the electrolytic solution 36 (an ion liquid in the electrolytic solution-impregnated layer) is included in a small amount and is non-volatile, and thus a problem such as leakage and combustion is not caused.

The electrolytic solution-impregnated layer 35 is a film functioning as a supply source of a polymer-gel electrolyte. The electrolytic solution-impregnated layer 35 is a film impregnated with an electrolytic solution that conducts lithium ions. That is, the electrolytic solution-impregnated layer 35 includes a support and a polymer-gel electrolyte (electrolytic solution).

The support is a member for physically supporting the structure of the electrolytic solution-impregnated layer (PEG film) 35. The support preferably does not precipitate any impurities, does not react with other materials such as the polymer-gel electrolyte, and has high wettability to an ion liquid+a Li salt+a monomer. When the support precipitates impurities or causes a chemical reaction, there is a concern that the characteristics may change. In addition, when the support has poor wettability, there is a concern that it may be impossible to uniformly form a macromolecule on the support. Meanwhile, it is also possible to improve the strength by increasing the proportion of a polymer component in the polymer-gel electrolyte without using the support; however, when the proportion of the polymer component is increased, the conductivity of Li decreases, and thus it is preferable to use the support. As the support, for example, long-fibered cellulose or hydrophobic polyvinylidene fluoride (PVDF) is used.

The polymer-gel electrolyte is required to be chemically stable with respect to Li and be capable of gelating so as to hold the electrolytic solution. An ordinary polyethylene glycol (PEG)-based film is chemically stable with respect to Li and is capable of confirming a battery operation. However, in the PEG film, the ion conductance is low, and an output practical for a battery cannot be obtained. Therefore, in the embodiment, a gel-polymer electrolyte from which an electrolytic solution is not volatilized is used.

The above-described assembly 4D can be formed using, for example, a method in which the electrolytic solution-impregnated layer 35 is adhered to one surface of the assembly of the active material compact 2 in which pores remain, the solid electrolyte layer 3, and the multiple oxide layer 5, and thus the electrolytic solution is supplied from the electrolytic solution-impregnated layer 35 to the pores.

The electrolytic solution-impregnated layer 35 is produced by, for example, impregnating a precursor solution including an electrolytic solution and a monomer into a support (base material) and photopolymerizing the precursor solution. The electrolytic solution includes an ion liquid and a lithium salt. As the ion liquid, for example, N-methyl-N-propyl pyrrolidinium bis(trifluoromethanesulfonyl) imide (P13-TFSI) is used. As the lithium salt, lithium N,N-bis (trifluoromethanesulfonyl) imide (Li-TFSI) is used. As the monomer, for example, polyethylene glycol diacrylate (TEGDA) is used. A polymerization initiator and ethylene carbonate are mixed with the above-described electrolytic solution, thereby obtaining a PGE-producing solution. As the polymerization initiator, for example, a radical-type photopolymerization initiator (for example, IRGACURE 651 manufactured by BASF, 2,2-dimethoxy-1,2-diphenylethane-1-on) is used. The polymerization initiator is mixed at, for example, a mixing ratio of 6:1 in terms of weight ratio. Ethylene carbonate is used as a solid electrolyte interface (SEI)-forming material. SEI is a coating that inactivates and stabilizes the surface of an LI electrode. SEI is generated by means of a reducing decomposition reaction of an electrolytic solution, and it is confirmed that, at the initial cycle, charges are consumed in the decomposition reaction of ethylene carbonate. Ethylene carbonate is mixed at a mixing ratio of 1. This PGE-producing solution is impregnated into a support. As the support, for example, a hydrophobic PVDF membrane filter manufactured by Nihon Millipore K. K. is used. Monomers are photopolymerized by radiating light (for example, ultraviolet rays) in a predetermined wavelength range to the support impregnated with the PGE-producing solution so as to produce a polymer, thereby obtaining the electrolytic solution-impregnated layer 35. The electrolytic solution in the electrolytic solution-impregnated layer 35 fills the remaining pores and functions as the electrolytic solution 36.

The electrolytic solution in the electrolytic solution-impregnated layer 35 has favorable wettability to an oxide solid electrolyte and intrudes into the remaining pores through the solid electrolyte layer 3, and the electrolytic solution 36 fills the pores. Therefore, the active material and the electrolyte more preferably adhere to each other, and it is possible to obtain the lithium secondary battery 100D having further improved characteristics.

Hitherto, the electrode assembly and the lithium secondary battery according to the invention have been described, but the invention is not limited thereto. The invention is widely applicable within the scope of the gist of the invention.

For example, the constitutions of the respective portions in the electrode assembly and the battery according to the invention can be replaced by arbitrary constitutions having the same function. In addition, other arbitrary constitutions may be added to the invention. In addition, out of the respective embodiments, two or more arbitrary constitutions (characteristics) may be combined together.

In addition, the battery according to the invention can also be applied to a lithium primary battery in addition to a lithium secondary battery which has been described in the respective embodiments. Furthermore, the battery can also be applied to a sodium ion battery, a magnesium battery, and the like.

Furthermore, one or more arbitrary steps may be added to the method for manufacturing the electrode assembly according to the invention.

EXAMPLES

Next, specific examples of the invention will be described.

1. Manufacturing of Assembly

Example 1

<1> First, a slurry obtained by adding polypropylene carbonate (manufactured by Sigma-Aldrich Co. LLC.) (5 parts by weight) to powder-form $LiCoO_2$ particles (manufactured by Sigma-Aldrich Co. LLC., hereinafter, also referred to as "LCO") and suspending the mixture in 1,4-dioxane (manufactured by Kanto Chemical Co., Inc.) (100 parts by weight) was molded into a green sheet by means of application and drying. This sheet was processed into a disc shape having a diameter of 10 mm and a thickness of 100 μm and was fired at 1,000° C. in the atmosphere for eight hours, thereby obtaining an active material compact (porous positive electrode sintered body) having a bulk density of 65%.

<2> Next, a solution obtained by dissolving La(NO$_3$)$_3$.6H$_2$O in 2-butoxyethanol was impregnated into the active material compact, and the active material compact was dried and then was sintered at 540° C. The internal surfaces of fine pores in the active material compact and a negative electrode-forming surface were converted to La$_2$Li$_{0.5}$Co$_{0.5}$O$_4$ layers by means of the above-described operation, thereby forming a multiple oxide layer in the active material compact.

<3> Next, a solution obtained by dissolving LiNO$_3$, La(NO$_3$)$_3$.6H$_2$O, Zr(OC$_4$H$_9$)$_4$ and Nb (OC$_2$H$_5$)$_5$ in 2-butoxyethanol was impregnated into the active material compact in which the multiple oxide layer was formed, and the active material compact was dried and then was fired at 800° C. in the atmosphere. Solid electrolyte layers were formed in the inside of the fine pores in the active material compact and on the negative electrode-forming surface by means of the above-described operation, thereby obtaining an assembly of Example 1.

Comparative Example

An assembly was produced in the same manner as in Example 1 except for the fact that the multiple oxide layer was not formed in Step <2>.

2. Evaluation of Assembly

For the respective assemblies of the example and the comparative example, the charge and discharge characteristics were evaluated as described below.

That is, the charge and discharge characteristics were measured using a multichannel charge and discharge evaluator (manufactured by Hokuto Denko Corp., HJ1001SD8). The charge and discharge characteristics were measured under conditions of a current density of 0.1 mA/cm$^2$, a constant current and a constant voltage with a charge voltage upper limit of 4.2 V, and a constant current driving with a discharge voltage lower limit of 3.0 V.

In addition, aluminum was used as a collector (positive electrode), and lithium and copper were used as an electrode (negative electrode) with respect to the respective assemblies of the example and the comparative example, thereby constituting secondary batteries. As the positive electrode, the joining surface of each of the assemblies was polished, and an aluminum plate was attached thereto, thereby forming an electrode. Regarding the negative electrode, first, an electrolyte layer was formed. A lithium-resistant layer was formed by applying, drying, and solidifying a liquid-form composition including methyl polymethacrylate (PMMA) (manufactured by Soken Chemical & Engineering Co., Ltd.), ethylene carbonate (manufactured by Sigma-Aldrich Co. LLC.), dimethyl carbonate (manufactured by Sigma-Aldrich Co. LLC.), and LiTFSI (Kishida Chemical Co., Ltd.). Furthermore, a lithium metal foil and a copper foil were sequentially laminated from the electrolyte layer, and the foils were compressed, thereby forming a negative electrode. For a lithium secondary battery obtained as described above, the charge and discharge characteristics were evaluated.

As a result, favorable charge and discharge characteristics were exhibited in the respective examples compared with the comparative example. That is, when the multiple oxide layer is formed between the active material compact and the solid electrolyte layer, an effect of improving the charge and discharge characteristics can be obtained.

What is claimed is:

1. An electrode assembly comprising:
an assembly including:
an active material section including an active material constituted of a transition metal oxide, the active material section including multiple through holes therein;
a solid electrolyte section including a solid electrolyte having an ion-conducting property; and
a multiple oxide section including at least one of a metal multiple oxide represented by Formula (II) or a derivative thereof, the multiple oxide section being formed in a lamellar form so as to cover the active material section and cover surfaces of the multiple through holes; and
a collector provided on at least one of the active material section and the multiple oxide section,
wherein the Formula (II) is:

$$Ln_2Li_{0.5}M_{0.5}O_4 \tag{II}$$

where Ln represents a lanthanoid element, and M represents a transition metal.

2. The electrode assembly according to claim 1, wherein the multiple oxide section is formed between the active material section and the solid electrolyte section.

3. The electrode assembly according to claim 1, wherein the solid electrolyte section forms a surface of the assembly on which another electrode for constituting a battery is provided.

4. The electrode assembly according to claim 1, wherein an electron conductivity of the multiple oxide section is higher than an electron conductivity of the active material section.

5. The electrode assembly according to claim 1, wherein the transition metal oxide includes at least one of lithium, cobalt, manganese, or nickel.

6. The electrode assembly according to claim 1, wherein the solid electrolyte has a garnet-type crystal structure or a garnet-type analogous crystal structure.

7. A battery comprising:
The electrode assembly according to claim 1; and
an electrode provided on a surface of the assembly.

8. A battery comprising:
the electrode assembly according to claim 2; and
an electrode provided on a surface of the assembly.

9. A battery comprising:
the electrode assembly according to claim 3; and
the other electrode which is provided on the surface formed by the solid electrolyte section.

10. A battery comprising:
the electrode assembly according to claim 4; and
an electrode provided on a surface of the assembly.

11. A battery comprising:
electrode assembly according to claim 5; and
an electrode provided on a surface of the assembly.

12. A battery comprising:
the electrode assembly according to claim 6; and
an electrode provided on a surface of the assembly.

* * * * *